United States Patent
Schleier-Smith et al.

(10) Patent No.: US 10,091,323 B2
(45) Date of Patent: Oct. 2, 2018

(54) SOCIAL DISCOVERY FEED FOR FACILITATING SOCIAL EXPLORATION IN SOCIAL NETWORKING ENVIRONMENTS

(71) Applicant: Tagged, Inc., San Francisco, CA (US)

(72) Inventors: Johann Schleier-Smith, San Francisco, CA (US); Greg Tseng, Los Altos, CA (US); Jared Kim, San Francisco, CA (US)

(73) Assignee: THE MEET GROUP, INC., New Hope, PA (US)

( * ) Notice: Subject to any disclaimer, the term of this patent is extended or adjusted under 35 U.S.C. 154(b) by 115 days.

(21) Appl. No.: 13/833,274

(22) Filed: Mar. 15, 2013

(65) Prior Publication Data

US 2013/0311560 A1   Nov. 21, 2013

Related U.S. Application Data

(60) Provisional application No. 61/648,360, filed on May 17, 2012.

(51) Int. Cl.
*H04L 29/08* (2006.01)
*G06Q 30/06* (2012.01)
*G06Q 50/00* (2012.01)

(52) U.S. Cl.
CPC ....... *H04L 67/306* (2013.01); *G06Q 30/0631* (2013.01); *G06Q 50/01* (2013.01)

(58) Field of Classification Search
CPC ... H04L 67/306; G06Q 30/0631; G06Q 50/01
(Continued)

(56) References Cited

U.S. PATENT DOCUMENTS 6,263,335 B1   7/2001 Paik et al.
7,539,673 B2 *  5/2009 Trowbridge ........ G06F 11/3438
(Continued)

FOREIGN PATENT DOCUMENTS

JP   2008-146246 A   6/2008
JP   2009-288995 A   12/2009
(Continued)

OTHER PUBLICATIONS

Notice of Allowance dated Apr. 22, 2014, for U.S. Appl. No. 13/714,937, by Dawson et al. filed Dec. 14, 2012.
(Continued)

*Primary Examiner* — Clayton R Williams
*Assistant Examiner* — Tania M Pena-Santana
(74) *Attorney, Agent, or Firm* — Perkins Coie LLP

(57) ABSTRACT

Systems and methods of generating a common social timeline to facilitate social discovery in a social networking environment are disclosed. In one aspect, embodiments of the present disclosure include a method, which may be implemented on a system, of receiving data items associated with users of the social network, identifying a first set of data items associated with a first user, and processing the first set of data items to select a first set of characteristics. The method further comprises comparing the first set of characteristics with other sets of characteristics describing other users to select a subset of the other users having one or more characteristics that are the same or similar to one or more of the first set of characteristics.

14 Claims, 11 Drawing Sheets

500 ⟶

*Common Characteristics*

| ID | Overlapping Time Indicator | Data Item Type | Data Item Description | Characteristic(s) |
|---|---|---|---|---|
| A1/B1 | 2007-2010 | Personal Profile Item | Lived in San Francisco | San Francisco, CA |
| A2/B2 | 2007 | Action | Liked San Francisco Forty-Niners | Sports, Football |
| A4/B3 | 03/2008 | Communication | Received Message from User A | Communication w/ user A |
| A6/B5 | N/A | Action | Tagged by User C | Action w/ user C |

(58) Field of Classification Search
USPC .......................................................... 709/204
See application file for complete search history.

(56) References Cited

U.S. PATENT DOCUMENTS

| | | | |
|---|---|---|---|
| 8,335,754 | B2 | 12/2012 | Dawson et al. |
| 8,352,859 | B2* | 1/2013 | Zuckerberg ....... G06F 17/30867 715/273 |
| 8,490,007 | B1* | 7/2013 | Hoffman et al. ............. 715/772 |
| 8,650,058 | B1* | 2/2014 | Salam .................... G06Q 10/06 705/7.12 |
| 8,756,185 | B2 | 6/2014 | Dawson et al. |
| 8,763,150 | B2 | 6/2014 | Flake et al. |
| 2003/0212543 | A1 | 11/2003 | Epstein et al. |
| 2005/0177385 | A1 | 8/2005 | Hull et al. |
| 2005/0182765 | A1 | 8/2005 | Liddy |
| 2005/0198031 | A1 | 9/2005 | Pezaris et al. |
| 2006/0129906 | A1 | 6/2006 | Wall |
| 2007/0192299 | A1 | 8/2007 | Zuckerberg et al. |
| 2007/0214141 | A1 | 9/2007 | Sittig et al. |
| 2007/0219933 | A1 | 9/2007 | Datig |
| 2008/0097974 | A1 | 4/2008 | Chen et al. |
| 2008/0133213 | A1 | 6/2008 | Pollara |
| 2008/0140650 | A1* | 6/2008 | Stackpole ........... G06F 17/3087 |
| 2009/0077061 | A1* | 3/2009 | Abercrombie, III ... G06Q 30/02 |
| 2009/0144392 | A1* | 6/2009 | Wang ..................... G06Q 10/10 709/217 |
| 2009/0164387 | A1 | 6/2009 | Armstrong et al. |
| 2009/0228361 | A1 | 9/2009 | Wilson et al. |
| 2009/0287674 | A1 | 11/2009 | Bouillet et al. |
| 2009/0327437 | A1* | 12/2009 | Estrada ................. H04L 12/587 709/206 |
| 2010/0083318 | A1* | 4/2010 | Weare ............... G06F 17/30035 725/46 |
| 2010/0197318 | A1* | 8/2010 | Petersen ................ G06Q 10/10 455/456.1 |
| 2010/0241580 | A1 | 9/2010 | Schleier-Smith |
| 2010/0257454 | A1 | 10/2010 | Lee et al. |
| 2011/0029665 | A1* | 2/2011 | Wenig ..................... H04L 67/22 709/224 |
| 2011/0213787 | A1 | 9/2011 | Cerny et al. |
| 2012/0082401 | A1 | 4/2012 | Berger et al. |
| 2012/0096037 | A1 | 4/2012 | Sittig et al. |
| 2012/0110429 | A1 | 5/2012 | Tzonis et al. |
| 2012/0251079 | A1 | 10/2012 | Meschter et al. |
| 2012/0272160 | A1* | 10/2012 | Spivack ................ G06Q 10/10 715/752 |
| 2012/0284341 | A1 | 11/2012 | Masood et al. |
| 2013/0073985 | A1 | 3/2013 | Hamlin et al. |
| 2013/0159412 | A1 | 6/2013 | Robinson et al. |
| 2013/0311482 | A1 | 11/2013 | Schleier-Smith et al. |
| 2013/0311486 | A1 | 11/2013 | Schleier-Smith et al. |
| 2014/0019533 | A1* | 1/2014 | Sherman et al. ............. 709/204 |
| 2014/0181208 | A1 | 6/2014 | Robinson et al. |
| 2015/0067064 | A1 | 3/2015 | Abercrombie, III et al. |
| 2015/0338233 | A1* | 11/2015 | Cervelli ............ G06F 17/30241 701/532 |
| 2016/0041911 | A1* | 2/2016 | Zhu ................... G06F 17/30371 711/135 |

FOREIGN PATENT DOCUMENTS

| | | |
|---|---|---|
| JP | 2012-003635 A | 1/2012 |
| KR | 10-2010-0130003 | 12/2010 |
| KR | 10-2012-0035606 | 4/2012 |

OTHER PUBLICATIONS

U.S. Appl. No. 13/833,243, of Schleir-Smith, J., et al., filed Mar. 15, 2013.
U.S. Appl. No. 13/833,406, of Schleir-Smith, J., et al., filed Mar. 15, 2013.
U.S. Appl. No. 12/718,692 of Dawson, K., et al., filed May 5, 2010.
U.S. Pat. No. 8,335,754 on Dec. 18, 2012.
U.S. Appl. No. 13/714,937, of Dawson et al. filed Dec. 14, 2012.
International Search Report and Written Opinion dated Aug. 19, 2013 for International Patent Application No. PCT/US13/41684 filed filed May 17, 2013.
International Search Report and Written Opinion dated Aug. 19, 2013 for International Patent Application No. PCT/US13/41690 filed filed May 17, 2013.
International Search Report and Written Opinion dated Aug. 19, 2013, for International Patent Application No. PCT/US13/41663 filed May 17, 2013.
Restriction Requirement dated Aug. 28, 2012 for U.S. Appl. No. 12/718,692, filed May 5, 2010.
Notice of Allowance dated Oct. 19, 2012 for U.S. Appl. No. 12/718,692, filed May 5, 2010.
Non-Final Office Action dated Nov. 7, 2013 for U.S. Appl. No. 13/714,937, by Dawson et al. filed Dec. 14, 2012.
Notice of Allowance dated Mar. 6, 2014, for U.S. Appl. No. 13/714,937, by Dawson et al. filed Dec. 14, 2012.
Banko, Michele et al.; "Open Information Extraction from the Web"; International Joint Conference on Artificial Intelligence Proceedings 2007; pp. 2670-2676; 2007.
Dichev, Christo and Dicheva, Darina; "View-Based Semantic Search and Browsing"; Proceedings of the 2006 IEEEI WIC/ACM International Conference on Web Intelligence; 2006.
Farzindar, Atefeh, Lapalme, Guy and Saggion, Horacio; Summaries with SumUM and its Expansion for Document Understanding Conference (DUC 2002); Workshop on Text Summarization; 2002.
Gelfand, Boris, Wulfekuhler, Marilyn and Punch, William F. III; "Automated Concept Extraction From Plain 25 Text"; MAI Technical Report WS-98-05; pp. 13-17; Association for the Advancement of Artificial Intelligence (AMI), USA; 1998.
Hammond, Brian, Sheth, Amit and Kochut, Krzysztof; "Semantic Enhancement Engine: A Modular Document Enhancement Platform for Semantic Applications over Heterogeneous Content"; Real World Semantic Web Applications; pp. 29-49; IOS Press; 2002.
Leake, David B. et al.; "Aiding Knowledge Capture by Searching for Extensions of Knowledge Models"; Second International Conference on Knowledge Capture; KoCAP'03, Oct. 23-25, 2003, Sanibel Island, Florida, USA; 2003.
Leake, David B., Maguitman, Ana and Reich Herzer, Thomas; "Topic Extraction and Extension to Support Concept Mapping"; Proceedings of FLAIRS-03; AAAI Press, Saint Augustine, FL, USA; 2003.
Leskovec, Jure, Grobelnik, Marko and Milic-Frayling, Natasa; "Learning Semantic Sub-graphs for Document Summarization"; Proceedings of the 7th International Multi-Conference Information Society IS 2004; vol. B; 2004.
Leuski, Anton, Lin, Chin-Yew and Hovy, Eduard; "iNeATS: Interactive Multi-Document Summarization"; Proceedings of the 41st Annual Meeting on Association for Computational Linguistics; pp. 125-128; vol. 2; Association for Computational Linguistics Morristown, NJ, USA; 2003.
Maisonnasse, Loic, Gaussier, Eric & Chevallet, Jean-Pierre; "Multi-Relation Modeling on Multi Concept Extraction"; Cross Language Evaluation Forum 2008; Working Notes for the CLEF 2008 Workshop, Denmark; 2008.
Merlo, Paola et al.; "Learning Document Similarity Using Natural Language Processing"; Linguistik Online; 17, 5/03; Europa—Universitat Viadrina in Frankfurt et al.; 2003.
Nazar, Rogelio, Vivaldi, Jorge and Wanner, Leo; "Towards Quantitative Concept Analysis"; Procesamiento del Lenguaje Natural;pp. 139-146; n039; Sociedad Espanola para el Procesamiento del Lenguaje Natural. Spain; 2007.
Poibeau, Thierry, Arcouteil, Alexandre and Grouin, Cyril; "Recycling an Information Extraction system to automatically produce Semantic Annotations for the Web"; Proceedings of the ECAI 2002 Workshop on Semantic Authoring, Annotation & Knowledge Markup; 2002.
Rajaraman, Kanagasabai and Tan, Ah-Hwee; "Knowledge Discovery from Texts: A Concept Frame Graph Approach"; Proceedings of the Eleventh International Conference on Information and Knowledge Management; pp. 669-671; ACM, New York, NY, USA; 2002.

(56) References Cited

OTHER PUBLICATIONS

Reichherzer, Thomas and Leake, David; "Towards Automatic Support for Augmenting Concept Maps With Documents"; 2nd International Conference on Concept Mapping; 2006.
Rusu, D. et al.; "Semantic Graphs Derived From Triplets with Application in Document Summarization"; Proceedings 23 of the 11th International Multiconference "Information Society—IS 2008"; pp. 198-201; 2008.
Saggion, Horacio and Lapalme, Guy; "Concept Identification and Presentation in the Context of Technical Text Summarization"; Proceedings of the Workshop on Automatic Summarization; pp. 1-10; Association for Computational Linguistics Morristown, NJ, USA; 2000.
Tifi, Alfredo and Lombardi, Antonietta; "Collaborative Concept Mapping Models"; Proc. of the Third Inl. Conference on Concept Mapping; 2008.
Valerio, Alejandro and Leake, David B.; "Associating Documents to Concept Maps in Context"; Proc. of the Third Inl. Conference on Concept Mapping; Tallinn, Estonia & Helsinki, Finland; 2008.
Valerio, Alejandro, Leake, David and Canas, Alberto J.; "Automatically Associating Documents with Concept Map Knowledge Models"; 33rd Latin American Conference in Informatics (CLEI 07); 2007.
Vallet, David et al.; "A contextual personalization approach based on ontological knowledge"; 17th European Conference on Artificial Intelligence (ECAI 2006); 2006.
Wafula, Belinda Ng'asia; "Automatic Construction of Concept Maps"; «online: http://www.cs.joensuu.fi/pages/ whamalai/sciwri/belinda.pdf»; 2006.
Zhang, Haiqin et al.; "A Study for Documents Summarization based on Personal Annotation"; Proceedings of the HL T-NAACL 03; pp. 41-48; vol. 5; Association for Computational Linguistics Morristown, NJ, USA; 2003.
Zouaq, Amal, Nkambou, Roger and Frasson, Claude; "Document Semantic Annotation for Intelligent Tutoring Systems: a Concept Mapping Approach"; FLAIRS 2007 Proceedings; 2007.
Notice of Allowance dated Sep. 21, 2015, U.S. Appl. No. 13/833,406, of Schleier-Smith, J., et al., filed Mar. 15, 2013.
Final Office Action dated Oct. 15, 2015, U.S. Appl. No. 13/833,243, of Schleier-Smith, J., et al., filed Mar. 15, 2013.
Notice of Allowance dated Oct. 19, 2015, U.S. Appl. No. 13/833,406, of Schleier-Smith, J., et al., filed Mar. 15, 2013.
Non-Final Office Action dated Mar. 4, 2015, U.S. Appl. No. 13/833,406, of Schleir-Smith, J., et al., filed Mar. 15, 2013.
Non-Final Office Action dated May 7, 2015, U.S. Appl. No. 13/833,243, of Schleier-Smith, J., et al., filed Mar. 15, 2013.
Final Office Action dated Jun. 22, 2015, U.S. Appl. No. 13/833,406, of Schleier-Smith, J., et al., filed Mar. 15, 2013.
Advisory Action dated Aug. 28, 2015, U.S. Appl. No. 13/833,406, of Schleier-Smith, J., et al., filed Mar. 15, 2013.

* cited by examiner

Common Characteristics

| ID | Overlapping Time Indicator | Data Item Type | Data Item Description | Characteristic(s) |
|---|---|---|---|---|
| A1/B1 | 2007-2010 | Personal Profile Item | Lived in San Francisco | San Francisco, CA |
| A2/B2 | 2007 | Action | Liked San Francisco Forty-Niners | Sports, Football |
| A4/B3 | 03/2008 | Communication | Received Message from User A | Communication w/ user A |
| A6/B5 | N/A | Action | Tagged by User C | Action w/ user C |

*FIG. 5*

SOCIAL DISCOVERY FEED FOR FACILITATING SOCIAL EXPLORATION IN SOCIAL NETWORKING ENVIRONMENTS

CLAIM OF PRIORITY

This application claims priority to U.S. Provisional Patent Application No. 61/648,360 entitled "SOCIAL DISCOVERY FEED FOR FACILITATING SOCIAL EXPLORATION IN SOCIAL NETWORKING ENVIRONMENTS," which was filed on May 17, 2012, the contents of which are expressly incorporated by reference herein.

CROSS-REFERENCE TO RELATED APPLICATION

This application is related to co-pending U.S. patent application Ser. No. 13/833,243 entitled "MULTI-USER TIMELINE FOR FACILITATING SOCIAL DISCOVERY IN SOCIAL NETWORKING ENVIRONMENTS," which has been concurrently filed on even date herewith, the contents of which are expressly incorporated by reference herein.

This application is related to co-pending U.S. patent application Ser. No. 13/833,406 entitled "SYSTEMS AND METHODS FOR GENERATING AUTOMATED SOCIAL NETWORKING INTERACTIONS," which has been concurrently filed on even date herewith, the contents of which are expressly incorporated by reference herein.

BACKGROUND

Social networks in online environments are increasingly relied upon by individuals to engage and participate in various types of social activities and behaviors. For example, individuals use online social networks to facilitate friendly, casual, romantic, business relationships and to maintain connections and initiate dialogues with others. With the prevalence of high speed network connections to the Internet and the availability of mobile devices with wireless capabilities, the online environment has become one of the dominating mechanisms through which people communicate and connect with one another.

For example, online social networks are increasingly used by many individuals of all ages and demographic groups to stay in touch and to stay connected with existing friends, family members, and business colleagues. Further, online social networks are also increasingly being used to build connections, acquaintances, or potential business partners. Via these online social networks, users can join common interest groups, meet others with similar interests, and/or have access to updated contact information for contacts, friends, and/or acquaintances. The vast and continuously growing user-base of online social networks further enhances the user's experience. However, the amount of relationship data and interaction data that users can collect and utilize makes finding and nurturing new social connections increasingly burdensome.

BRIEF DESCRIPTION OF THE DRAWINGS

FIG. 5 depicts a table illustrating an example of operation of a host server in determining characteristics that are common to a first user and a second user for generation of a social discovery feed, according to one embodiment.

DETAILED DESCRIPTION

Figure 1:
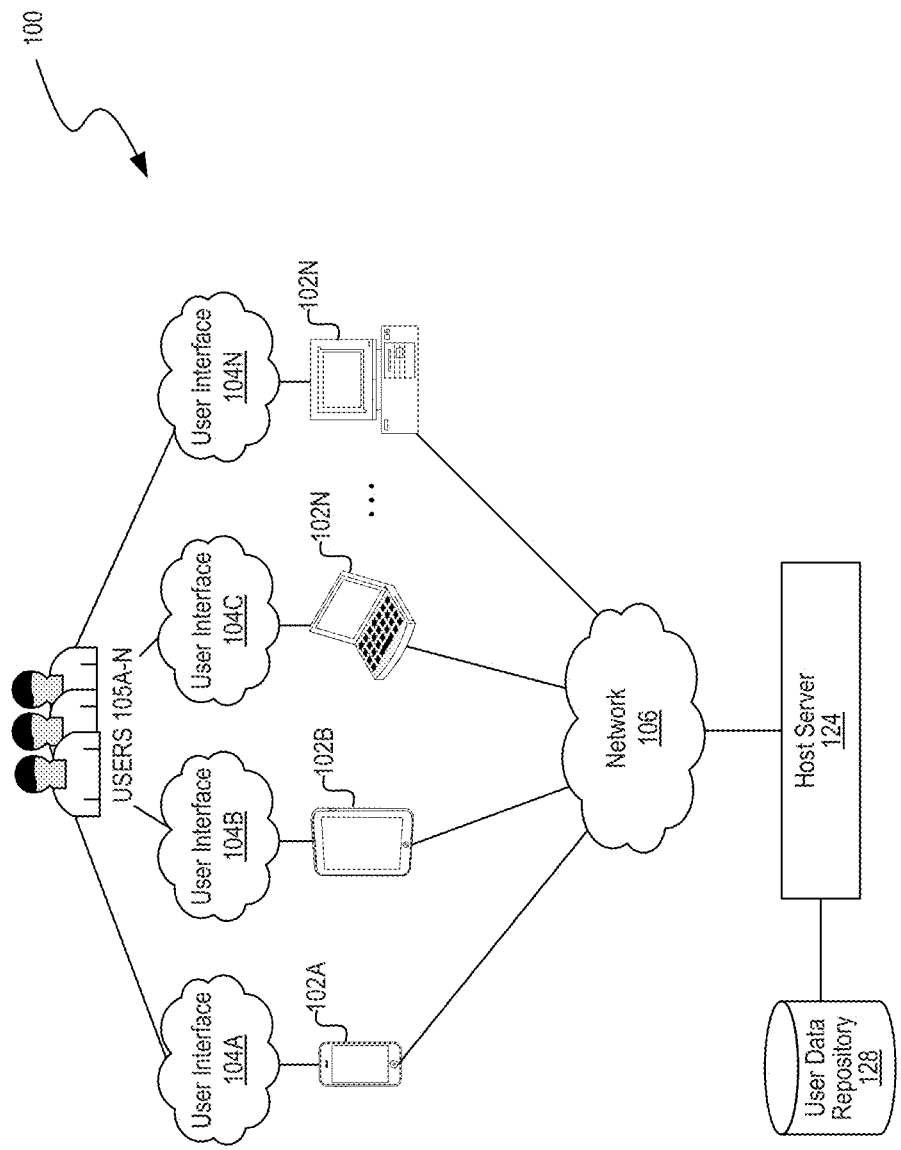
FIG. 1 illustrates a block diagram of client devices or user devices able to communicate with the host server for generating a social discovery feed for facilitating social discovery in a web-based social networking environment, according to one embodiment.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for generating a social discovery feed for facilitating social discovery in a web-based social networking environment. More specifically, the techniques introduced herein provide for systems and methods for generating a social discovery feed for electronic presentation to a user. The social discovery feed illustrates a plurality of recent data items that are initiated by selected users of the social network. The selected users are determined by the host server based on characteristics and/or similarities in the actions initiated by the users. The selected users are not yet social connections of the user to which the social discovery feed is being presented. Accordingly, the social discovery feed described herein conveys information to a user about other (selected) users in the social network that have similar characteristics and/or other (selected) users that have performed actions that might be of interest to the user.

In one embodiment, the social discovery feed is generated for and presented to a primary user. The selection of other users (i.e., users that are not social connections with primary user) for the social discovery feed can be based on those users having similar characteristics to the primary user. The characteristic information can be derived by the host server by processing and/or analyzing received data items associated with the users at the host server. Among other things, the data items can indicate profile information (public or private information) associated with a user, electronic communications sent and/or received by the user, and/or actions taken by or acted upon a user within the web-based social networking environment.

FIG. 1 illustrates a block diagram of client devices or user devices 102A-N able to communicate with the host server 124 for generating a social discovery feed to facilitate social discovery in a web-based social networking environment 100, according to one embodiment.

The plurality of client devices or user devices 102A-N can be any system and/or device, and/or any combination of devices/systems that is able to establish a connection with another device, a server and/or other systems. The client devices or user devices 102A-N typically include display or other output functionalities to present data exchanged between the devices to a user. For example, the client devices can be, but are not limited to, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. In one embodiment, client devices or user devices 102A-N are coupled to a network 106. In some embodiments, the devices 102A-N may be directly connected to one another.

The network 106, over which client devices or user devices 102A-N and the host server 124 communicate, may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc. The network 106 can be any collection of distinct networks operating wholly or partially in conjunction to provide connectivity to the client devices or user devices 102A-N and host server 124 and may appear as one or more networks to the serviced systems and devices. In one embodiment, communications to and from client devices or user devices 102A-N can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The user data repository 128 can store software, descriptive data, images, system information, drivers, and/or any other data item utilized by other components of the host server 124 and/or any other servers for operation. The user data repository 128 may be coupled to the host server 124. The user data repository 128 may be managed by a database management system (DBMS), for example but not limited to, Oracle, DB2, Microsoft Access, Microsoft SQL Server, PostgreSQL, MySQL, FileMaker, etc. The user data repository 128 can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

In some embodiments, the host server 124 is able to provide data to be stored in the user data (or data item) repository 128 and/or can retrieve data stored in the user data repository 128. The user data repository 128 can store static user data and dynamic user data. The status user data can include user information of the users in the online social network. For example, static user data can include descriptive data of current and past personal information such as, but not limited to, a first name and last name of the user, a valid email ID, a unique user name, age, marital status, occupations, locations lived and worked, education, home town, schools attended, number of siblings, heritage, ethnicity, race, etc. The user information further includes interest information, which may include, but is not limited to, activities, hobbies, professional information, photos, etc.

In one embodiment, the user data stored in user data repository 128 is explicitly specified by the user. For example, when the user (e.g., visitor/service subscriber) signs up for services such as social networking related services, a set of information may be required, such as a valid email address, an address of service, a valid credit card number, social security number, a username, and/or age. The user information form can include optional entries, by way of example but not limitation, location, activity, hobbies, ethnicity, photos, etc. Examples of user data stored in the user data repository 128, including, but not limited to, user name, user occupation/position, user address, subscription information, hardware ID, hardware model, software version ID, etc. The user data may be entered by a user via a profile. In some cases, each user data may include additional information about whether the user information is public and/or private. For example, the information may include privacy information indicating what, if anything, other users of the social network can view with respect to the user data.

The user data repository 128 can also store dynamic user data. Dynamic user data can either be explicitly submitted by the user or provided via one or more software agents and/or hardware modules such as the host server 124 coupled to the user data repository 128. Dynamic user data can be any action or communication initiated by a user of the social network. For example, a user can periodically update his/her user profile which can be stored in the user data repository 128. Similarly, user preferences can be automatically identified and stored in the repository.

In some embodiments, dynamic information or activities such as user interactions (social interactions), relationships with other users, user connections, social records, social history records, and/or any communication records can be recorded and stored in the user data repository 128. In this manner, the dynamic user data essentially tracks the electronic actions that a user performs within the social networking environment. Examples of dynamic information include, but are not limited to, indications that a user would like to meet another user, indications that a user liked something, indications that a virtual gift was sent or received, indications that a wink was sent or received, and/or indications that a user tagged another user or was tagged by another user. Any electronic action that a user can take within the social network comprises dynamic user data.

The user data repository 128 is shown as a discrete component in the example of FIG. 1; however, in some embodiments, the user data repository 128 may be included in the host server 124. Additionally, in some embodiments, the user data repository and/or the host server 124 may be both physically and/or functionally distributed.

In one embodiment, the host server 124 is configured to facilitate social exploration in the web-based social networking environment 100. The host server 124 facilitates the social exploration by generating a social discovery feed for a primary user that illustrates recently received data items from a plurality of selected users that have similar characteristics to the primary user. An example of the generated social discovery feed is illustrated and discussed in greater detail with respect to FIG. 6.

In one embodiment, some of all of the functionally described herein with respect to the host server 124 can be alternatively or additionally performed, in whole or in part, at one or more of the client devices or user devices 102A-N.

Figure 2:
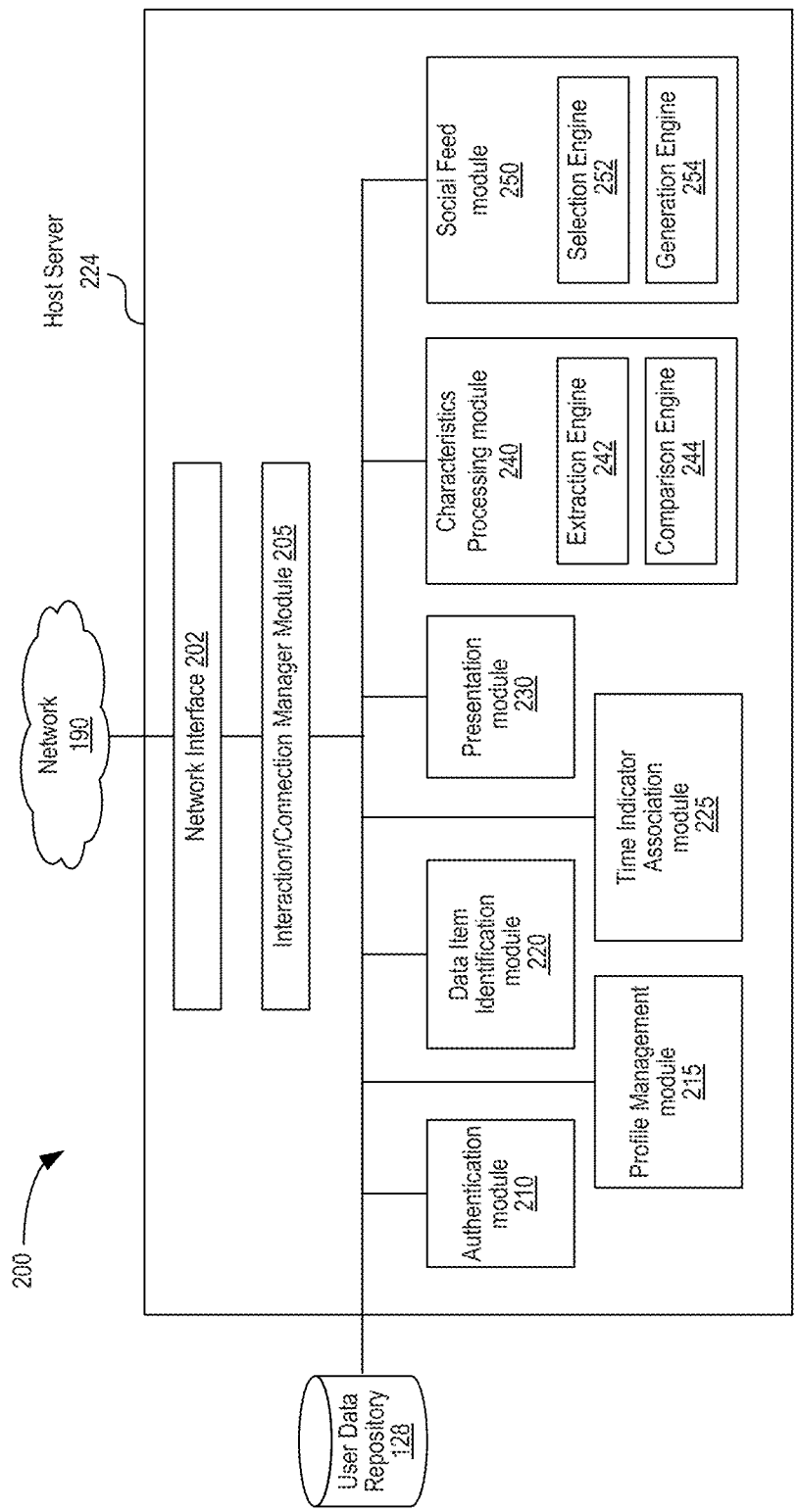
FIG. 2 depicts a block diagram of the components of a host server that generates social discovery feed for facilitating social discovery in a web-based social networking environment, according to one embodiment.

FIG. 2 depicts a block diagram of the components of a host server 224 that generate a social discovery feed for facilitating social discovery in a web-based social networking environment, according to one embodiment.

The host server 224 includes a network interface 202, an interaction/connection manager module 205, an authentication module 210, a profile management module 215, a data item identification module 220, a time indicator association module 225, a presentation module 230, a characteristics module 240, and a social feed module 250. In one embodiment, the host server 224 is coupled to a user data repository 128. The user data repository 128 is described in greater detail with reference to the example of FIG. 1. Additional or less modules can be included without deviating from the novel art of this disclosure. In addition, each module in the example of FIG. 2 can include any number and/or combination of sub-modules and/or systems, implemented with any combination of hardware and/or software.

The host server 224, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

In the example of FIG. 2, the network interface 202 can be a networking device that enables the host server 224 to mediate data in a network with an entity that is external to the host server, through any known and/or convenient communications protocol supported by the host and the external entity. The network interface 202 can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

One embodiment of the host server 224 includes the interaction/connection manager module 205. The interaction/connection manager module 205 can be any combination of software agents and/or hardware modules able to identify, detect, track, manage, record, and/or process an occurrence of an interaction, an action, a relationship, an existing connection, and/or a requested connection. The interaction/connection manager module 205, when in operation, is able to communicate with the network interface 202 to identify and detect and/or receive data items including, but not limited to, a set of social interactions or social connection that occurred among multiple users in an online social network. In general, the social interactions that occurred in the online social network are initiated by users using client devices or user devices (e.g., a cell phone, a telephone, a SmartPhone, a PDA, an iPhone, a Blackberry, a computer, a laptop, and/or a Palmtop, etc.). Any type of connections or interactions can be detected and subsequently tracked and/or received and/or recorded for further processing and analysis. The types of connections/social connections can include relationships of various types (e.g., friendship, collegial, family, romantic, gaming, etc.) or relationships/connections of unspecified types. A connection in an online social network generally refers to users who have requested and accepted a connection request and are thus mutually connected.

The interactions/actions that occur in an online social network can include by way of example, but not limitation, sending or receiving an invitation to establish a social connection in the social network, sending or receiving a message, viewing a profile, posting a comment, posting information, joining a group, sending or receiving an invitation to an event or party, belonging to a group, creating a group, etc. The interaction/connection manager module 205 records these actions and determines the sender and recipient of these actions. If the action pertains to a group, the interaction/connection manager module 205 also determines and stores the associated group.

In one embodiment, the social interactions detected by the interaction/connection manager module 205 also includes sending a notification of interest, receiving a notification of interest, and/or responding to a notification of interest. For example, a notification of interest may be sent to a relevant user identified for a particular user when the particular user has indicated interest. The relevant user may respond to the notification if also interested in the particular user. Note that the notifications of interest sent to the particular user may be anonymous or non-anonymous. More specific examples of notifications of interest can include, but are not limited to, indications that a user would like to meet another user, indications that a virtual gift was sent or accepted, indications that a wink was sent or accepted, and/or indications that a user tagged another user. These interactions (also referred to as actions herein) are also tracked by the interaction/connection manager module 205.

In one embodiment, the interaction/connector module 205 determines the date/time of the occurrence of the event and stores the timestamp associated with the occurrence. The date and/or time associated with the occurrence of the event is used in the comparison of data items and the generation of the social timelines which illustrate the temporal relationships between various events (i.e., data items) associated with two or more users and graphically illustrates these relationships to one or more of the two or more users.

One embodiment of the host server 224 includes the authentication module 210. The authentication module 210 can be any combination of software agents and/or hardware components able to manage and register users of host server 224. For example, the authentication module 210 is configured to register new users with the system and/or create new accounts with the host server 224. During registration the user can provide, among other things, login credentials. The authentication module 210 is configured to authenticate the users as they access the host server 224 from a variety of devices. In some embodiments, authentication occurs by associating a user's username and password with an existing user account. Unauthorized users can be directed to register with the system.

One embodiment of the host server 224 includes the profile management module 215. The profile management module 215 can be any combination of software agents and/or hardware components able to control and manage modifications to user profiles. For example, a user can periodically update his/her user profile which can be stored in the user data repository 128. The user profile can include a variety of personal information describing the user. Some of this information can be public information that other users can view and some of the information can be private. Likewise some information in a users profile may be viewable to some users but not to others. For example, social connections or friends of the user may be able to view the user's profile while non-social connections are not able to view the user's profile.

One embodiment of the host server 224 includes the data item identification module 220. The data item identification module 220 can be any combination of software agents and/or hardware components able to access data items in the user data repository 128 and/or in the interaction/connection manager module 205 and identify sets of data items associated with users of the social networking environment. Each set of data items corresponds (or is initiated by) a single user.

One embodiment of the host server 224 includes the time indicator association module 225. The time indicator association module 225 can be any combination of software agents and/or hardware components able to receive data items from the user data repository 128 and/or the interaction/connection manager module 205, determine whether the data items have time indicators included with them, determine time indicators for the activities if time indicators are not included, associate the time indicator with the activities, and/or store the activities associated with the associated time indicators. Unlike the interaction/connection manager module 205 which can determine the date/time of the occurrence of the event, the time indicator association module 225 determines if the event (or data item) already includes a time indicator that identifies a time period during which the associated event is/was valid. For example, a user may modify his/her personal profile information to indicate an event (e.g., working at a specific place) and include with the event a time indicator (e.g., 2008 or a time period 2007-2008). Similarly, a time indicator can indicate an ongoing event with an ongoing time period (e.g., 2007-present).

One embodiment of the host server 224 includes a presentation module 230. The presentation module 230 can be any combination of software agents and/or hardware modules able to present a social discovery feed to a client device for electronic presentation to a user. In one embodiment, the presentation module 230 is coupled the social feed module 250 and the user data repository 128. When in operation, the presentation module 230 identifies an active user (e.g., the user that sent the request to generate the social discovery feed) and presents the social discovery feed to an associated client device for electronic presentation to a user. The user device may be, for example, a computer, laptop, cell phone, Blackberry, iPhone, etc. The presented social discovery feed can include images, and/or textual information, etc.

One embodiment of the host server 224 includes a characteristics module 240. The characteristics module 240 can be any combination of software agents and/or hardware modules able to process sets of data items associated with a user to select (extract or determine) one or more characteristics describing the user based on the data items and compare the characteristics with other sets of characteristics describing other users that are not socially connected to the user in the social networking environment. In the example of FIG. 2, the characteristics module 240 includes a characteristics extraction engine 242 and a characteristics comparison engine 244.

In one embodiment, the characteristics module 240 includes the extraction engine 242 that is configured to extract and/or select and/or otherwise determine characteristics associated with users based on the received data items. In particular, the extraction engine 242 processes the sets of data items to select characteristics describing the associated users. Examples of processing and extraction and/or determination of the characteristics is discussed in greater detail with reference to FIG. 4A-B.

In one embodiment, the characteristics module 240 includes the comparison engine 244 that is configured to compare the characteristics associated with a user to other characteristics associated with other users. In comparing the characteristics, the characteristics module 244 may determine new characteristics and/or select characteristics from a list or group of characteristics pre-defined and/or configurable by the host server.

One embodiment of the host server 224 includes the social feed module 250. The social feed module 250 can be any combination of software agents and/or hardware components able to generate a social feed for facilitating social discovery in a web-based social networking environment. The social feed module 250, when in operation, is able to communicate with the characteristics module 240 to facilitate social discovery for a primary user by identifying and selecting a subset the users for having one or more characteristics that are the same or similar to the characteristics describing (or associated with) the primary user. Once the subset of users is selected, the social feed module can then generate a social discovery feed illustrating recently received data items associated the subset of users.

In the example of FIG. 2, the social feed module 250 includes a selection engine 252 and a generation engine 254. The selection engine 252 is configured to select a subset of the other users that have one or more characteristics that are the same or similar to one or more of the characteristics of a primary user. In one embodiment, the selection engine 252 ranks the user based on the one or more characteristics that are the same or similar. In addition, the selection engine 252 may apply a weight to certain characteristics so that those characteristics are given greater consideration when ranking the users (i.e., those users that are not currently in the social network of the primary user) for inclusion in the social network feed of the primary user.

In one embodiment, the social feed module 250 includes the generation engine 254. The generation engine 254 is configured to generate a social discovery feed illustrating recently received data items associated with a subset of users (two or more users) that are not currently social connections with the primary user. The generation engine 254 can use the connections/interactions (or data items) and/or the user data repository 128 along with the presentation module 230 to generate the social discovery feed. The received data items to be included in the social discovery feed (i.e., the recently received data items associated with the subset of users) can be determined based on whether the data items have been received within time threshold. The time threshold can be pre-determined by the host server and/or configurable by a user of the web-based social network. An example of a social discovery feed is illustrated and discussed in greater detail with respect to FIG. 6.

Figure 3:
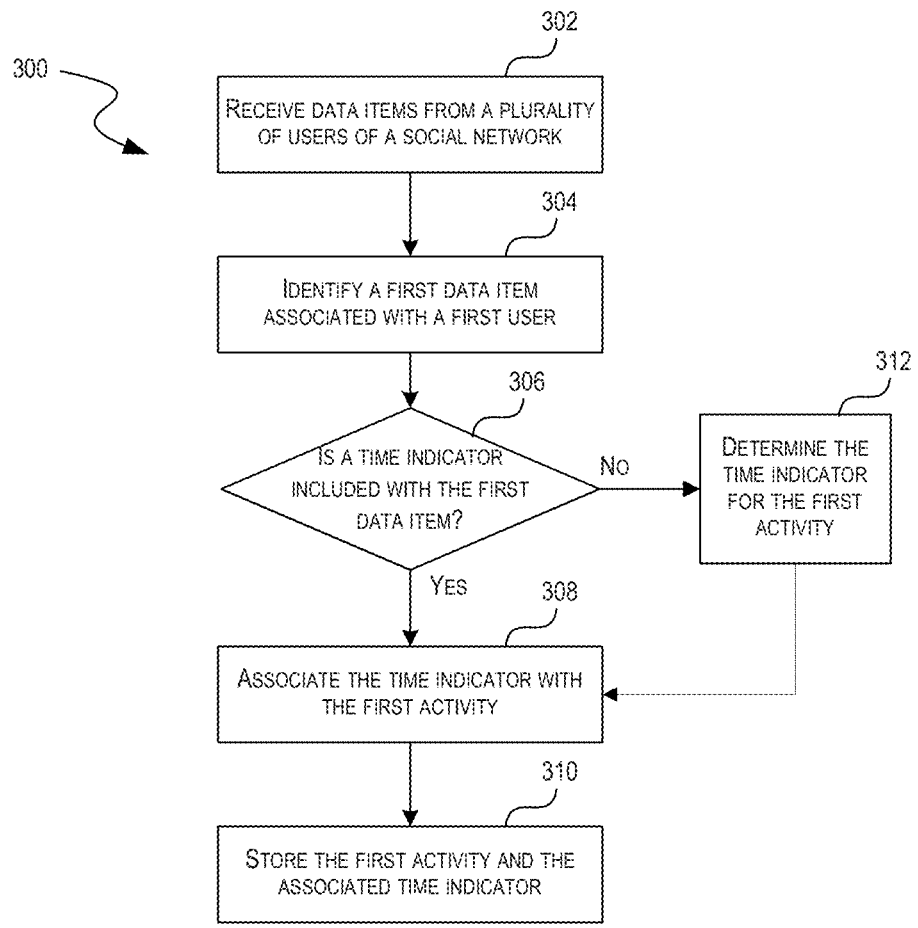
FIG. 3 depicts a flow diagram illustrating an example process for managing received data items from a plurality of users of a web-based social networking environment, according to one embodiment.

FIG. 3 depicts a flow diagram illustrating an example process 300 for managing data items received from a plurality of users of a web-based social networking environment such as, for example web-based social networking environment 100 of FIG. 1, according to one embodiment.

The operations or steps illustrated with respect to FIG. 3 are discussed with respect to operation of a host server such as, for example, host server 124 of FIG. 1. However, the operations or steps may be performed in various embodiments by a mobile device, such as, for example, client device or user device 102 of FIG. 1, one or more processors, and/or other components, modules, engines, or tools discussed herein. Additional or fewer data flow operations are possible.

In process 302, the host server receives data items from a plurality of users of a social network. For example, the host server may receive data items including, but not limited to, a set of social interactions or social connections that occurred among multiple users in an online social network. In general, the social interactions that occurred in the online social network are initiated by users using client devices or user devices (e.g., a cell phone, a telephone, a SmartPhone, a PDA, an iPhone, a Blackberry, a computer, a laptop, and/or a Palmtop, etc.). As discussed, any type of connections or interactions (or actions) can be detected and subsequently tracked and/or received and/or recorded for further processing and analysis.

As discussed above, each social interaction that occurs in the online social network is initiated by a user. In process 304, the host server identifies a first data item associated with a first user. In process 306, the host server determines whether a time indicator is included with the first identified data item. Time indicators may be included with a data item in cases where a time period associated with the activity is relevant such as, for example, when a user modifies profile information that relates to areas or regions in where a user currently or previously lived or worked. Examples of user profile information that includes one or more time identifiers is discussed in greater detail with respect to FIG. 7A-7B and FIG. 8. If a time indicator is not associated with the first data item then, in process 312, the host sever determines a time indicator for the first data item. For example, a time of occurrence of the data item or activity may be identified or determined as the proper time indicator for the first data item.

Once the data item has been determined, or if a time indicator is already included with the first data item then, in process 308, the host server associates the time indicator with the first activity. Lastly, in process 310, the host server stores the first activity and the associated time indicator. For example, the host server can store the first activity and the associated time indicator in a user data repository such as, for example, the user data repository 128 of FIG. 1.

Figure 4A:
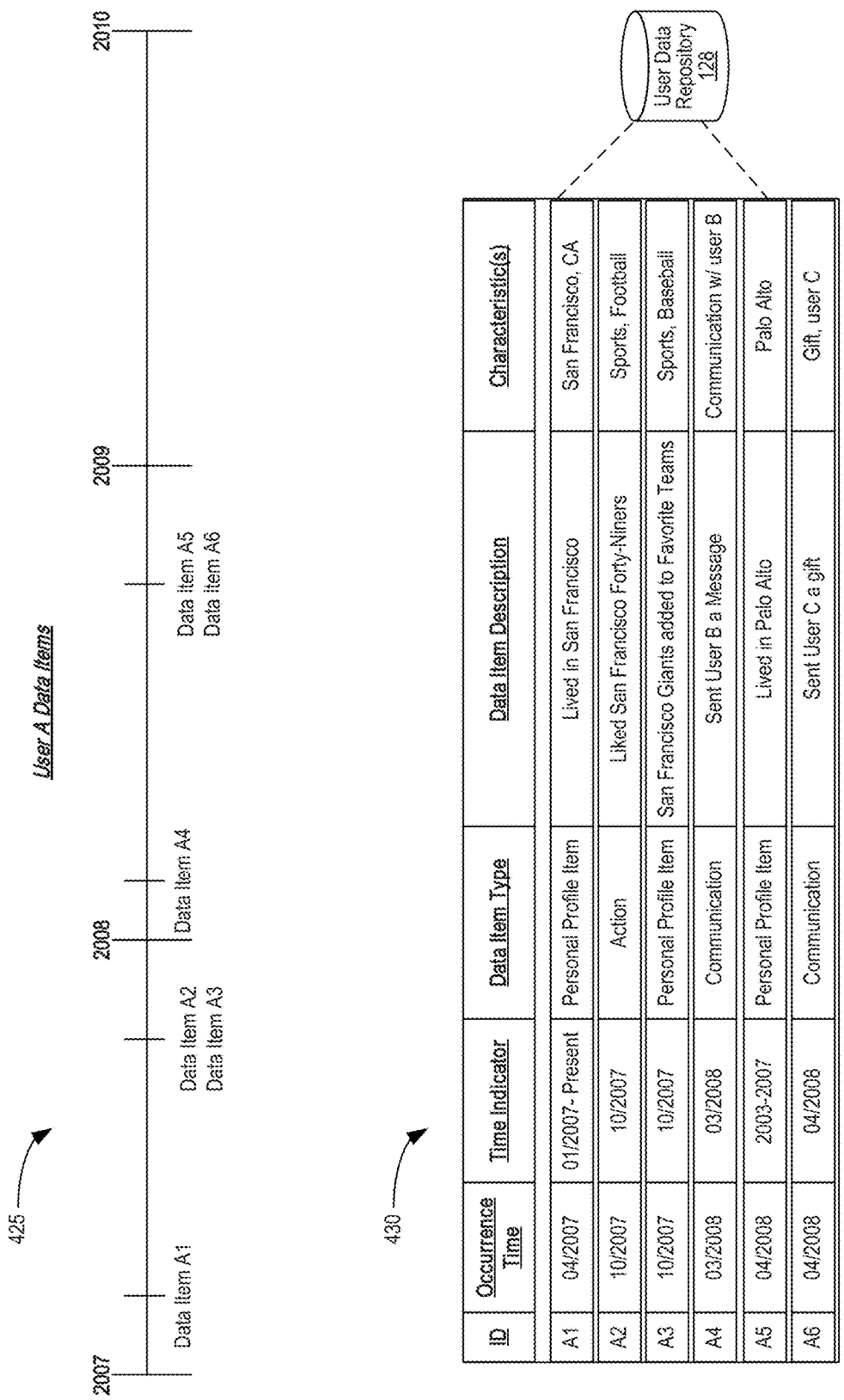
FIG. 4A and FIG. 4B depict diagrams illustrating examples of operation of a host server in processing incoming data items initiated by a first user A and a second user B, respectively, according to one embodiment.
Figure 4B:
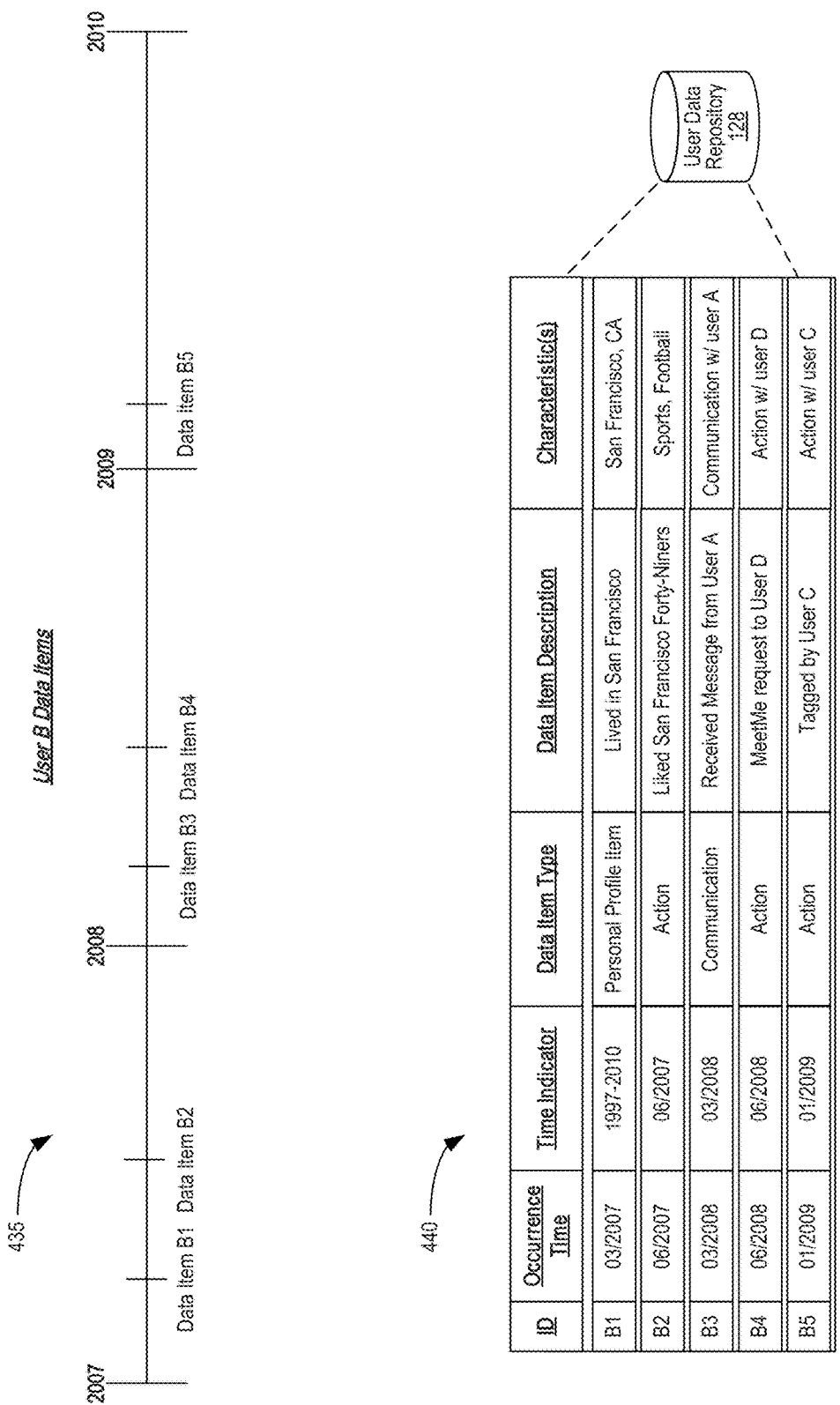

FIG. 4A and FIG. 4B depict diagrams illustrating examples of operation of a host server in processing incoming data items to select or otherwise determine characteristics defining a first user A and a second user B, respectively. In the examples of FIG. 4A and FIG. 4B a characteristic is selected for each received data item; however, it is appreciated that a host server may select several characteristics based on a single received data item. Likewise, the host server may process several data items to determine a single characteristic.

Referring first to FIG. 4A, which illustrates an example of incoming data items initiated by a first user A and storing the data items in a user data repository such as, for example, the user data repository 128 of FIG. 1. The example illustrated in FIG. 4A includes a graphical representation of the occurrence times of various data items associated with a first user A that were received by a host server such as, for example, the host server 124 of FIG. 1. The example of FIG. 4A includes a time interval 425 and an example table 430 illustrating how the data items initiated by the first user A can be stored, according to one embodiment. The time interval 425 illustrates data items that are received during a time interval period starting in the year 2007 and ending in the year 2010. It is appreciated that the time interval period and the data items associated with the user A, as shown, are for illustrative purposes only and can be any duration of time.

The host server may receive any number of data items during any given time intervals. In the example of FIG. 4A, six data items A1-A6 associated with or initiated by the first user A are received by the host server at various times within the time interval 425. When a data item is received, the host server determines if a time indicator is included and, if not, the data item is associated with the occurrence time of the data item. Otherwise, if a time indicator is included, as is the case with data item A1 and data item A5, then the included time indicator is associated with the data item. The data item and the associated time indicator is subsequently stored in the user data repository 128, as shown in table 430.

In addition each received data item is processed, either individually or as a group of data items, by the host server to select one or more characteristics describing the user. The characteristics describing a first (or primary) user are later compared to other characteristics describing other users in order to select and/or otherwise identify other users of the social network that are not currently social connections of the first user. The characteristics may include, but are not limited to, key words, cities, geographical regions, hobbies, interests, users with which the first user A has had communications, etc.

Referring now to FIG. 4B, which illustrates an example of incoming data items initiated by a second user B and storing the data items in a user data repository such as, for example, the user data repository 128 of FIG. 1. The example illustrated in FIG. 4B includes a graphical representation of the occurrence times of various data items associated with a second user B that were received by a host server such as, for example, the host server 124 of FIG. 1. The example of FIG. 4B includes a time interval 435 and an example table 440 illustrating how the data items initiated by the second user B can be stored, according to one embodiment. The time interval 435 illustrates data items that are received during a time interval period starting in the year 2007 and ending in the year 2010. It is appreciated that the time interval period and the data items associated with the user B, as shown, are for illustrative purposes only.

The host server may receive any number of data items during any given time intervals. In the example of FIG. 4B, five data items B1-B5 associated with or initiated by the second user B are received by the host server at various times within the time interval 435. When a data item is received, the host server determines if a time indicator is included and, if not, the data item is associated with the occurrence time of the data item. Otherwise, if a time indicator is included, as is the case with data item B1, then the included time indicator is associated with the data item. The data item and the associated time indicator is subsequently stored in the user data repository 128, as shown in table 440.

In addition each received data item is processed, either individually or as a group of data items, by the host server to select one or more characteristics describing the user. The characteristics describing a first (or primary) user are later compared to other characteristics describing other users in order to select and/or otherwise identify other users of the social network that are not currently social connections of the first user. The characteristics may include, but are not limited to, key words, cities, geographical regions, hobbies, interests, users with which the second user B has had communications, etc.

FIG. 5 depicts a table 500 illustrating an example of operation of a host server in determining characteristics that are common to a first user and a second user for generation of a social discovery feed, according to one embodiment. A host server such as, for example, the host server 124 of FIG. 1 processes the characteristics associated with the first user A (i.e., the characteristics as selected in FIG. 4A) and the characteristics associated with the second user B (i.e., the characteristics as selected in FIG. 4B) to identify the characteristics that are common to both the first user A and the second user B. Although not shown for simplicity of discussion, it is appreciated that the host server may rank the potential users to include in a social discovery feed. Additionally, in some cases, the host server can apply a weight to one or more characteristics so that some characteristics can be given more or less consideration during the ranking process.

A host server such as, for example, the host server 124 of FIG. 1 processes the data items associated with the first user A (i.e., the data items as received in FIG. 4A) and the data items associated with the second user B (i.e., the data items as received in FIG. 4B) to identify the first set of data items that are common to both the first user A and the second user B. In one embodiment, the processing is initiated by the first user A sending a message for delivery to the host server indicating that he/she has an interest in exploring his/her commonalities with other users. In other embodiments, the processing may be initiated automatically by the host server in some instances or even by the second user B who may indicate that he/she has an interest in having this determination of commonalities computed and made available for display to other users of the web-based social network.

In the example of FIG. 5, the host server has identified four common characteristics between the first user A and the second user B. The common characteristics indicate the underlying characteristics associated with the first user A and the second user B that were compared. In this case, the first common characteristic (i.e., "A1/B1") is the result of comparing characteristic A1 of FIG. 4A and characteristic B1 of FIG. 4B.

In one embodiment, the characteristics that are common to both the first user A and the second user B have overlapping time indicators. The host server may take into account overlapping time indicators when determining common characteristics; however, this is optional. Further, in some cases, the host server may weigh characteristics with overlapping time indicators higher than characteristics without overlapping time indicators. In the example of FIG. 5, the overlapping time indicator for the first common characteristic ("A1/B1") is determined to be the time period from 2007 to 2010. However, there is no overlapping time for the fourth common characteristic ("A6/B5").

In one embodiment, the time indicators associated with a data item may include both fine and coarse identifiers. For example, a fine identifier may be a day or month and the coarse identifier may be the year. When determining the overlapping time periods it is possible that only the coarse identifiers of the compared data items overlap. Such is the case with respect to the second common data item A2/B2. In this case, both user A and user B indicated that they liked the San Francisco Forty-Niners; however, the data item associated with user A has a time indicator of "10/2007" and the data item associated with user B has a time indicator of "06/2007." Thus, although the fine time identifiers do not overlap, the coarse identifiers do, and thus the host server determines the overlapping time indicator to be 2007. It is appreciated that even if the fine identifiers do overlap, that host server may still determine the time indicator based only on the coarse identifiers depending the configuration of the host server. That is, the overlapping time identifier determination by the host server can be configurable by the user and/or an administrator via one or more parameters.

Figure 6:
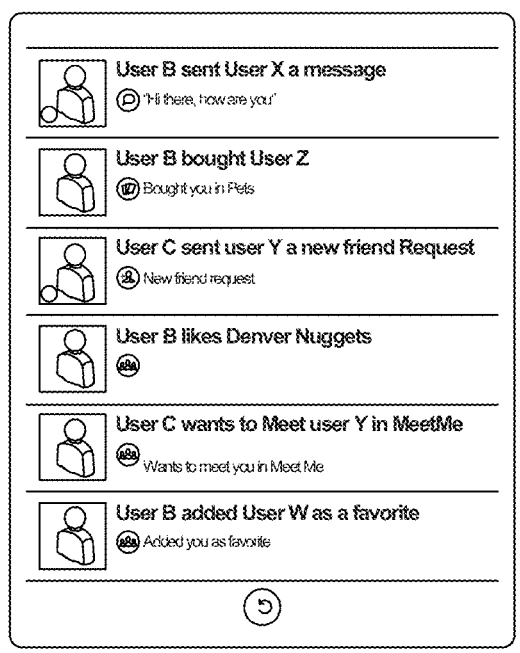
FIG. 6 illustrates an example of a social discovery feed for facilitating social discovery in a web-based social networking environment, according to an embodiment.

FIG. 6 illustrates an example of a social discovery feed 600 for facilitating social discovery in a web-based social networking environment, according to an embodiment. In particular, in the example of FIG. 6, the host server generates a social discovery feed 600 illustrating recently received data items associated with a user B and user C which are selected by the host server. As discussed herein, user B and user C are selected by the host server because they have one or more characteristics that are the same or similar to the characteristics of user A. The social discovery feed 600 can then be presented to the user A for facilitating social discovery.

Figure 7A:
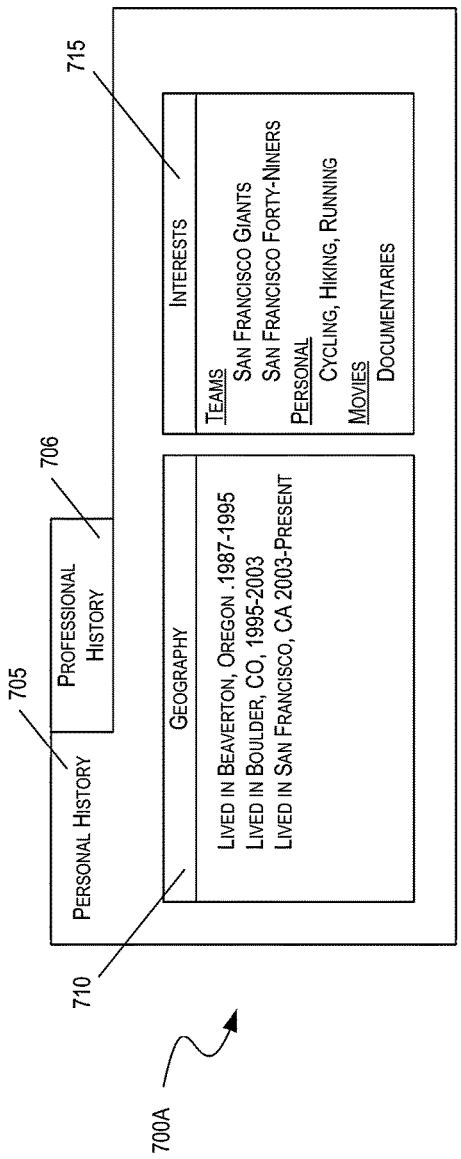
FIG. 7A and FIG. 7B illustrate example user interfaces showing user-profile pages for entering personal history and professional history, respectively, according to one embodiment.
Figure 7B:
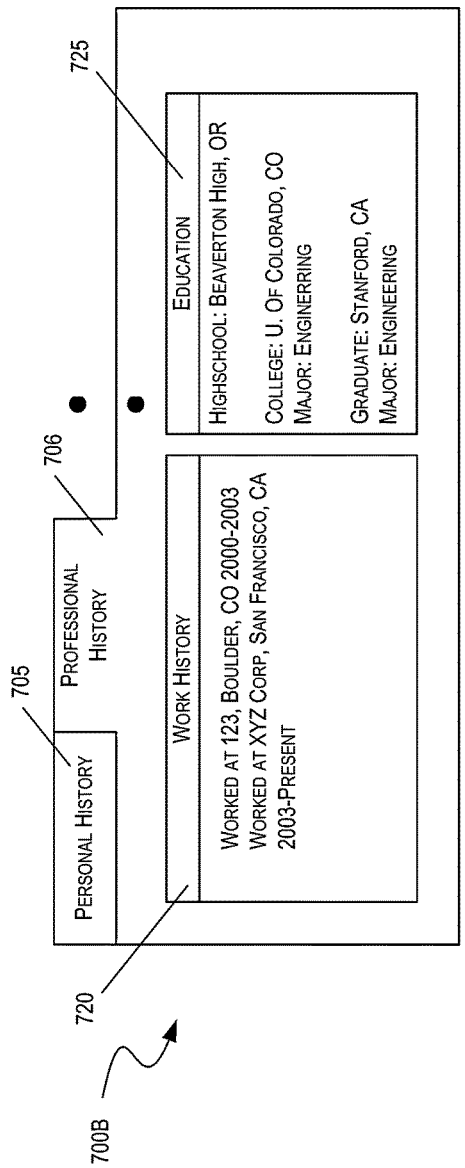

FIG. 7A and FIG. 7B illustrate example user interfaces showing a user-profile page (or pane) 700A for entering personal history and user-profile page (or pane) 700B for entering professional history, respectively. The user-profile pages 700A can be displayed to a user when, for example, the user selects a personal history tab 705 to modify his/her personal profile. Similarly, the user-profile page 700B can be displayed to a user when, for example, the user selects a professional history tab 706. In the example of FIG. 7A, a personal history page (or pane) is shown including a geography section 710 and an interests section 715. In the example of FIG. 7B, a professional history page (or pane) is shown including a work history section 720 and an education section 725. From these profile pages (or panes), a user can view, edit, select, and/or modify personal profile information.

Figure 8:
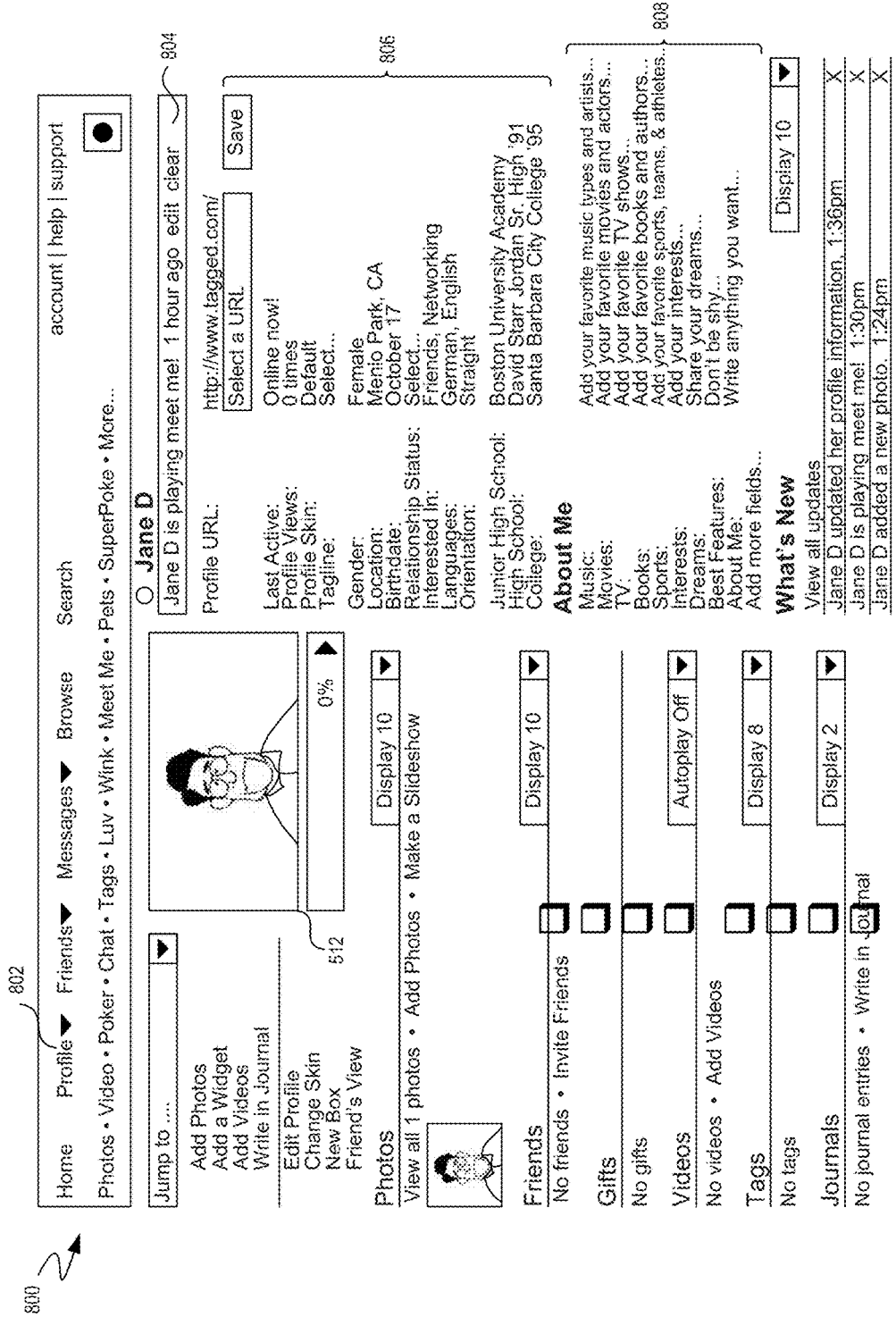
FIG. 8 illustrates an example user interface showing a user-profile page, according to one embodiment.

FIG. 8 illustrates an example user interface showing a user-profile page 800, according to one embodiment. The user-profile page 800 can be displayed when a user logs on to the online social network and/or when a user selects a profile button such as, for example, profile button 802. The user-profile page also includes the user's status update field 804. The user's profile information can be shown and edited via various fields 806 and 808. In fields 806, the user's biographical information can be shown and/or edited. In fields 808, the user's interest and hobbies can be shown and/or edited. For example, the user can provide information relating to favorite music types and artists, favorite movies, favorite TV shows, favorite books, favorite sports, and other interests.

In the example shown, the user is able to access various features and services offered in the social network using the options provided in tab 802. In addition, the user may upload a photograph. For example, the options in tab 802 include selections allowing the user to access the home page, edit the profile, view friends, and/or review messages, etc.

When the user edits any of the various fields 806 and/or 808 and selects save, one or more new data items are sent to the host server for processing and saving as discussed herein.

Figure 9:
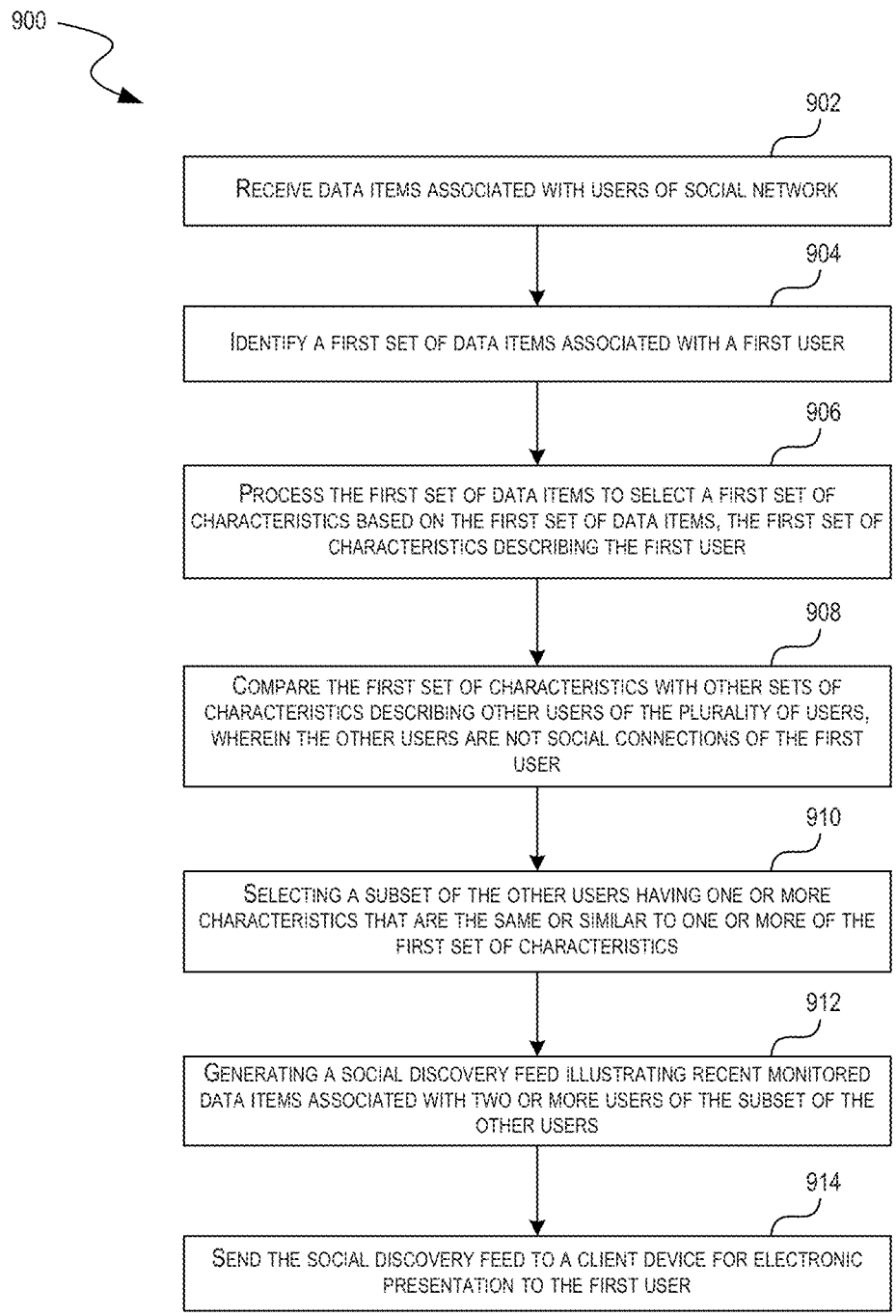
FIG. 9 depicts a flow diagram illustrating an example process for generating a social discovery feed for facilitating social discovery in a web-based social networking environment, according to one embodiment.

FIG. 9 depicts a flow diagram illustrating an example process 900 for generating a social discovery feed for facilitating social discovery in a web-based social networking environment such as, for example web-based social networking environment 100 of FIG. 1, according to one embodiment.

The operations or steps illustrated with respect to FIG. 9 are discussed with respect to operation of a host server such as, for example, host server 124 of FIG. 1. However, the operations or steps may be performed in various embodiments by a mobile device, such as, for example, client device or user device 102 of FIG. 1, one or more processors, and/or other components, modules, engines, or tools discussed herein. Additional or fewer data flow operations are possible.

In process 902, the host server receives data items associated with users of a social network. For example, the host server may receive data items upon request from a user data repository such as, for example, the user data repository 124 of FIG. 1. Alternatively or additionally, the host server can receive the data items directly from an interaction/connection manager module such as, for example, the interaction/connection manager module 205 of FIG. 2. In one embodiment, the host server may monitor the received data items received at the interaction/connection manager module and/or the user data repository.

As previously discussed, one or more of the plurality of data items may comprise a social interaction between the users and/or a modification to profile information associated with one of the plurality of users of the web-based social network. Further, in some instances, the modification to the profile information indicates a geographical area including an associated time indicator. In process 904, the host server identifies a first set of data items of the plurality of data items. In this example, the first set of data items is associated with a first user of the plurality of users. In addition, in some embodiments, the host server may identify other sets of data items associated with other users of the plurality of data items.

In process 906, the host server processes the first set of data items to select a first set of characteristics that describe the first user based on the first set of data items. The selected characteristics can describe the first user and/or behavior(s) of the first user within the web-based social network. For example, the characteristics may include, but are not limited to, key words, cities, geographical regions, hobbies, interests, users with which the primary user has had communications, etc. In one embodiment, the host server may determine new characteristics and/or select characteristics from a list or group of characteristics pre-defined and/or configurable by the host server. In one embodiment, the host server processes data items for key words or phrases related to popular or trending topics in order to determine or identify characteristics.

In one embodiment, the host server may process other sets of data items to generate other sets of characteristics associated with the other users. In this case, the host server may process public and non-public data items associated with the other users of the plurality of users. That is, the host server may compare private user information to determine that the users have the same or similar characteristics. As discussed above, the characteristics can describe the on-line behavior of one or more of the users of the plurality of users of the web-based social network as determined by one or more of the data items associated with the one or more users.

In process 908, the host server compares the first set of characteristics with other sets of characteristics describing other users of the plurality of users. In this example, the other users are not currently social connections of the first user; however, the social discovery feed is presented to the first user so that the first user and the other users may eventually become social connections facilitating social exploration.

In process 910, the host server selects a subset of the other users that have one or more characteristics that are the same or similar to one or more of the characteristics describing the first user (i.e., the first set of characteristics). In one embodiment, the characteristics that are the same or similar (e.g., common) have overlapping time indicators. For example, a characteristic associated with a first user may be compared to a second characteristic associated with a second user to determine whether the first characteristic and the second characteristic are the same or similar.

In process 912, the host server generates a social discovery feed illustrating recently received data items associated with two or more selected users of the subset of the other users. Lastly, in process 914, the host server sends the social discovery feed to a client device for electronic presentation to the first user.

Figure 10:
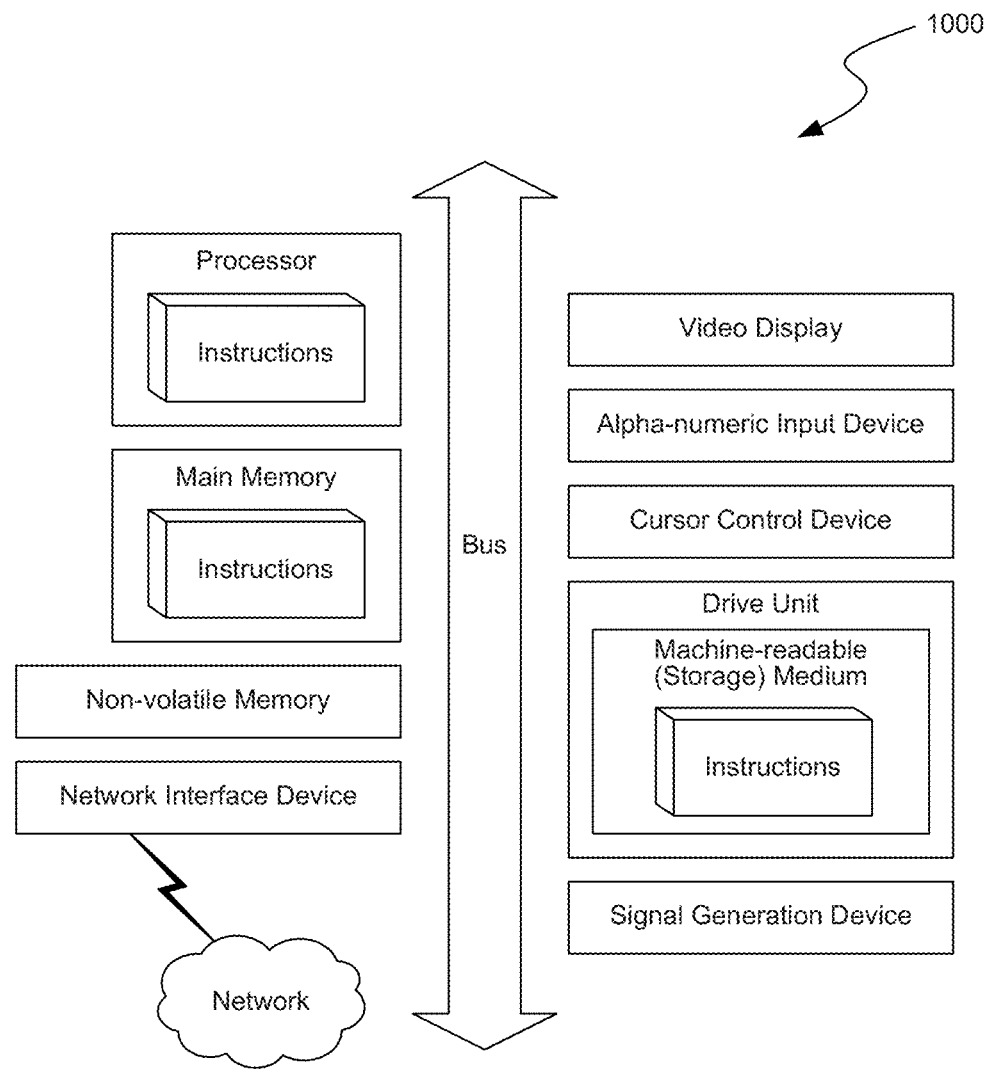
FIG. 10 shows a diagrammatic representation of a machine in the example form of a computer system within which a set of instructions, for causing the machine to perform any one or more of the methodologies discussed herein, may be executed, according to one embodiment.

FIG. 10 shows a diagrammatic representation of a machine in the example form of a computer system 1000 within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine.

While the machine-readable medium is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under U.S.C. § 112, ¶6 will begin with the words "means for".) Accordingly, the applicant reserves the right to add additional claims after filing the application to pursue such additional claim forms for other aspects of the disclosure.

What is claimed is:

1. A method of facilitating social exploration in a social network, the method comprising:
    receiving, at a computer system, a plurality of data items associated with a plurality of users of the social network, wherein a first data item of the plurality of data items includes:
        a first descriptive data, wherein the first descriptive data includes geographic locations, interests and history associated with a corresponding user of the plurality users,
        a first occurrence time that includes a timestamp of an occurrence of the first descriptive data in the social network, and
        a first time-indicator associated with the first descriptive data, the first time indicator indicating a time interval during which the first descriptive data is valid, the first time indicator and the first occurrence time being distinct attributes of the first data item, and wherein the receiving further includes:
        determining whether a second descriptive data of a second data item of the plurality of data items is associated with a second time indicator, the second time indicator indicating a time interval during which the second descriptive data is valid,
        responsive to a determination that the second descriptive data is not associated with the second time indicator, associating a timestamp of a second occurrence time of the second descriptive data in the social network with the second time indicator;
    comparing, at the computer system, a first set of data items describing a first user of the plurality of users and other sets of data items describing other users of the plurality of users to identify:
        a first collection of data items having common descriptive data whose time indicators overlap, wherein the common descriptive data includes descriptive data of other users that have a commonality with descriptive data of the first set of data items describing the first user, and
        a second collection of data items having the common descriptive data whose time indicators do not overlap, wherein the other users are not social connections of the first user;
    selecting, at the computer system, a subset of the other users based on the first collection of data items and the second collection of data items, wherein the subset of the other users have one or more characteristics that are similar to one or more characteristics of the first user, wherein the first collection of data items, which includes data items that have the common descriptive data with overlapping time indicators, is assigned a higher weight than the second collection of data items having the common descriptive data that do not have overlapping time indicators; and
    generating, at the computer system, a social discovery feed including the subset of the other users, wherein the social discovery feed is dynamically updated to include recent social interaction associated with the subset of the other users on the social network.

2. The method of claim 1, further comprising:
    sending, from the computer system, the social discovery feed to a client device for electronic presentation to the first user.

3. The method of claim 1, wherein one or more of the recent social interaction comprises a modification to profile information associated with the subset of other users of the social network.

4. The method of claim 1, wherein the first descriptive data includes key words or phrases related to popular or trending topics.

5. The method of claim 1, wherein the first descriptive data concerning the history associated with the corresponding user of the plurality of users describes the on-line behavior of the corresponding user of the social network.

6. The method of claim 1, wherein the social discovery feed includes only recent social interaction associated with the subset of other users that has been received by the computer system within a specified period of time.

7. A system for facilitating social exploration in a social network, the system comprising:
    an interaction module configured to monitor a plurality of data items associated with a plurality of users of the social network, wherein a first data item of the plurality of data items includes:
        a first descriptive data, wherein the first descriptive data includes geographic locations, interests and history associated with a corresponding user of the plurality users,
        a first occurrence time that includes a timestamp of the occurrence of the first descriptive data in the social network, and
        a first time indicator associated with the first descriptive data, the first time indicator indicating a time interval during which the first descriptive data is valid, the first time indicator and the first occurrence time being distinct attributes of the first data item, and wherein the interaction module is configured to:
        determine whether a second descriptive data of a second data item of the plurality of data items is associated with a second time indicator, the second time indicator indicating a time interval during which the second descriptive data is valid,
        responsive to a determination that the second descriptive data is not associated with the second time indicator, associate a time stamp of a second occurrence time of the second descriptive data in the social network with the second time indicator;

a comparison module configured to compare a first set of data items describing a first user of the plurality of users and other sets of data items describing other users of the plurality of users to identify
   a first collection of data items having common descriptive data whose time indicators overlap, wherein the common descriptive data includes descriptive data of other users that have a commonality with descriptive data of the first user, and
   a second collection of data items having the common descriptive data whose time indicators do not overlap, wherein the other users are not social connections of the first user;

a social feed module configured to:
   select a subset of the other users based on the first collection of data items and the second collection of data items, wherein the subset of the other users have one or more characteristics that are similar to one or more characteristics of the first user, wherein the first collection of data items, which includes data items that have the common descriptive data with overlapping time indicators, is assigned a higher weight than the second collection of data items having the common descriptive data that do not have overlapping time indicators, and
   generate a social discovery feed including the subset of the other users, wherein the social discovery feed is dynamically updated to include recent social interaction associated with the subset of the other users on the social network.

8. The system of claim 7, further comprising:
an interface configured to send the social discovery feed to a client device for electronic presentation to the first user.

9. The system of claim 7, further comprising:
a profile management module configured to manage profile information associated with one or more of the users of the social network, wherein one or more of the recent social interaction comprises a modification to profile information associated with the subset of other users of the social network.

10. The system of claim 7, wherein the first descriptive data includes key words or phrases related to popular or trending topics.

11. The system of claim 7, wherein the first descriptive data concerning the history associated with the corresponding user of the plurality of users describes the on-line behavior of the corresponding user.

12. The system of claim 7, wherein the social discovery feed includes only recent social interaction associated with the subset of other users that has been received within a specified period of time period, the specified period of time configurable by the first user.

13. A machine-readable storage medium having stored thereon a set of non-transitory instructions which when executed, causes a processor to perform a method of facilitating social exploration in a social network, the method comprising:

receiving, at a computer system, a plurality of data items associated with a plurality of users of the social network, wherein a first data item of the plurality of data items includes:
   a first descriptive data, wherein the first descriptive data includes geographic locations, interests and history associated with a corresponding user of the plurality users,
   a first occurrence time that indicates a timestamp of the occurrence of the first descriptive data in the social network, and
   a first time indicator associated with the first descriptive data, the first time indicator indicating a time interval during which the first descriptive data is valid, and wherein the receiving includes:
     determining whether a second descriptive data of a second data item of the plurality of data items is associated with a second time indicator, the second time indicator indicating a time interval during which the second descriptive data is valid,
     responsive to a determination that the second descriptive data is not associated with the second time indicator, associating a time stamp of a second occurrence time of the second descriptive data in the social network with the second time indicator;

comparing, at the computer system, a first set of data items describing a first user of the plurality of users and other sets of data items describing other users of the plurality of users to identify:
   a first collection of data items having common descriptive data whose time indicators overlap, wherein the common descriptive data includes descriptive data of other users that have a commonality with descriptive data of the first set of data items describing the first user, and
   a second collection of data items having the common descriptive data whose time indicators do not overlap, wherein the other users are not social connections of the first user;

selecting, at the computer system, a subset of the other users based on the first collection of data items and the second collection of data items, wherein the subset of the other users have one or more characteristics that are similar to one or more characteristics of the first user, wherein the first collection of data items, which includes data items that have the common descriptive data with overlapping time indicators, is assigned a higher weight than the second collection of data items having the common descriptive data that do not have overlapping time indicators; and generating, at the computer system, a social discovery feed including the subset of the other users, wherein the social discovery feed is dynamically updated to include recent social interaction associated with the subset of the other users on the social network.

14. The machine-readable storage medium of claim 13, wherein the method further comprising:
sending, from the computer system, the social discovery feed to a client device for electronic presentation to the first user.

* * * * *